(12) United States Patent
Chen

(10) Patent No.: US 7,273,310 B2
(45) Date of Patent: Sep. 25, 2007

(54) BACKLIGHT MODULE

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/478,409

(22) Filed: Jun. 28, 2006

(65) Prior Publication Data

US 2007/0064441 A1   Mar. 22, 2007

(30) Foreign Application Priority Data

Sep. 22, 2005   (CN) .................... 2005 1 0037507

(51) Int. Cl.
*F21V 29/00* (2006.01)
(52) U.S. Cl. .................. 362/580; 362/632; 362/218; 362/373
(58) Field of Classification Search ............. 362/632, 362/611, 580, 218, 373
See application file for complete search history.

(56) References Cited

U.S. PATENT DOCUMENTS 6,333,772 B1   12/2001   Mori et al.

2002/0113919 A1*   8/2002   Liu et al. ...................... 349/65
2004/0228110 A1*   11/2004  Hsieh et al. .................. 362/31
2004/0264197 A1*   12/2004  Bewig et al. ............... 362/294
2006/0002142 A1*   1/2006   Jeong et al. ................. 362/612

\* cited by examiner

*Primary Examiner*—Laura Tso
(74) *Attorney, Agent, or Firm*—Jeffrey T. Knapp

(57) ABSTRACT

An edge-lighting type backlight module (10) includes a light guide plate (12), at least one light sources (14), a reflector (16), a thermally conductive layer (18), and a plurality of heat pipes (20). The light guide plate has a light incident surface (120). The at least one light source is disposed adjacent to the light incident surface, and partly surrounded by the reflector. The thermally conductive layer is formed on an inner surface of the reflector near to the at least one light source, and the heat pipes attached to an outer surface of the reflector facing away from the at least one light source. A direct type backlight module (30) includes a diffuser plate (32), a reflector (34), at least one light sources (36), a thermally conductive layer (38), and a plurality of heat pipes (40).

17 Claims, 3 Drawing Sheets

BACKLIGHT MODULE

TECHNICAL FIELD

The present invention relates to backlight modules, and particularly to backlight modules for use in, light display devices such as, for example., liquid crystal display devices.

DISCUSSION OF RELATED ART

In a liquid crystal display device, liquid crystal is a substance that does not itself radiate light. Instead, the liquid crystal relies on receiving light from a light source, thereby displaying images and data. In the case of a typical liquid crystal display device, a backlight module powered by electricity supplies the needed light.

Backlight modules generally include edge-lighting type backlight modules and direct type backlight modules. Referring to FIG. 5, the edge-lighting type backlight module 50 includes a light guide plate 52, at least one light source 54, and a reflector 56. The light guide plate has a light incident surface 520. The at least one light source 54 is disposed adjacent to the light incident surface 520, and partly surrounded by the reflector 56. Referring to FIG. 6, the direct type backlight module 60 includes a diffuser plate 62, a reflector 64, and at least one light source 66. The at least one light source 66 is arranged between the diffuser plate 62 and the reflector 64. Light sources used in the backlight modules include light emitting diodes (LEDs), and cold cathode fluorescent lamps (CCFLs).

Generally, heat produced by the at least one light source can be transferred to a heat dissipating plate via air convection and dissipated into the external environment. However, the air has a relatively small thermal conductivity coefficient, and, as such, heat dissipation is slow. Eventually, the heat accumulated in the backlight module will be such that it can't be transferred to the heat dissipating plate in time, and the apparatus may over-heat as a result.

Therefore, what is needed, is a backlight module having high heat dissipation efficiency.

SUMMARY

An edge-lighting type backlight module includes a light guide plate, at least one light sources, a reflector, a thermally conductive layer, and a plurality of heat pipes. The light guide plate has a light incident surface. The at least one light source is disposed adjacent to the light incident surface, and partly surrounded by the reflector. The thermally conductive layer is formed on an inner surface of the reflector facing the at least one light source, and the heat pipes attached to an outer surface of the reflector facing away from the at least one light source.

A direct type backlight module includes a diffuser plate, a reflector, at least one light sources, a thermally conductive layer, and a plurality of heat pipes. The at least one light source is arranged between the diffuser plate and the reflector. The thermally conductive layer is formed on an inner surface of the reflector near to the at least one light source. The heat pipes are connected to an outer surface of the reflector facing away from the at least one light source.

BRIEF DESCRIPTION OF THE DRAWINGS

Many aspects of the present backlight module can be better understood with reference to the following drawings. The components in the drawings are not necessarily drawn to scale, the emphasis instead being placed upon clearly illustrating the principles of the present backlight module. Moreover, in the drawings, like reference numerals designate corresponding parts throughout the several views.

DETAILED DESCRIPTION OF PREFERRED EMBODIMENTS

Reference will now be made to the drawings to describe in detail the preferred embodiments of the present backlight module.

Figure 1:
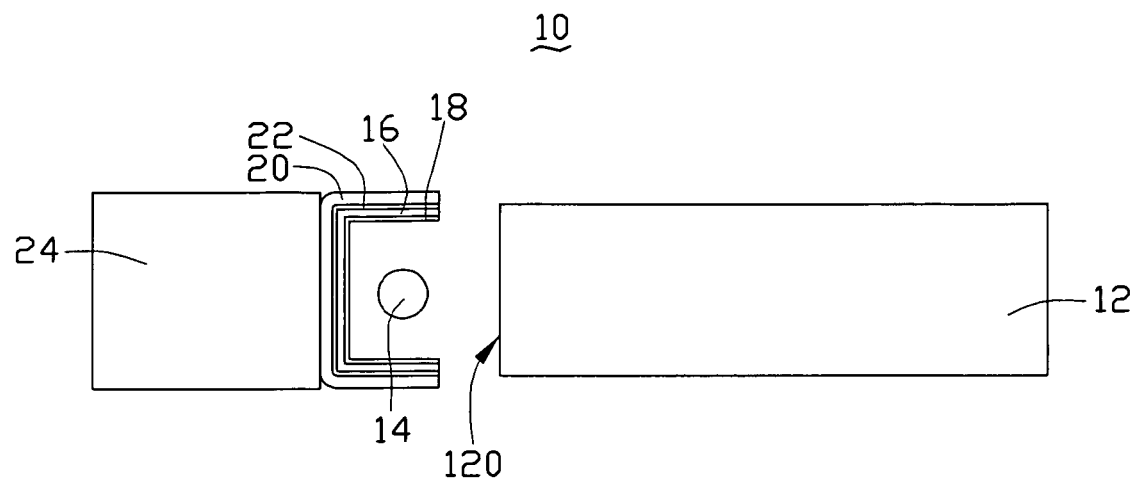
FIG. 1 is a schematic, side view of an edge-lighting type backlight module in accordance with a preferred embodiment.
Figure 2:
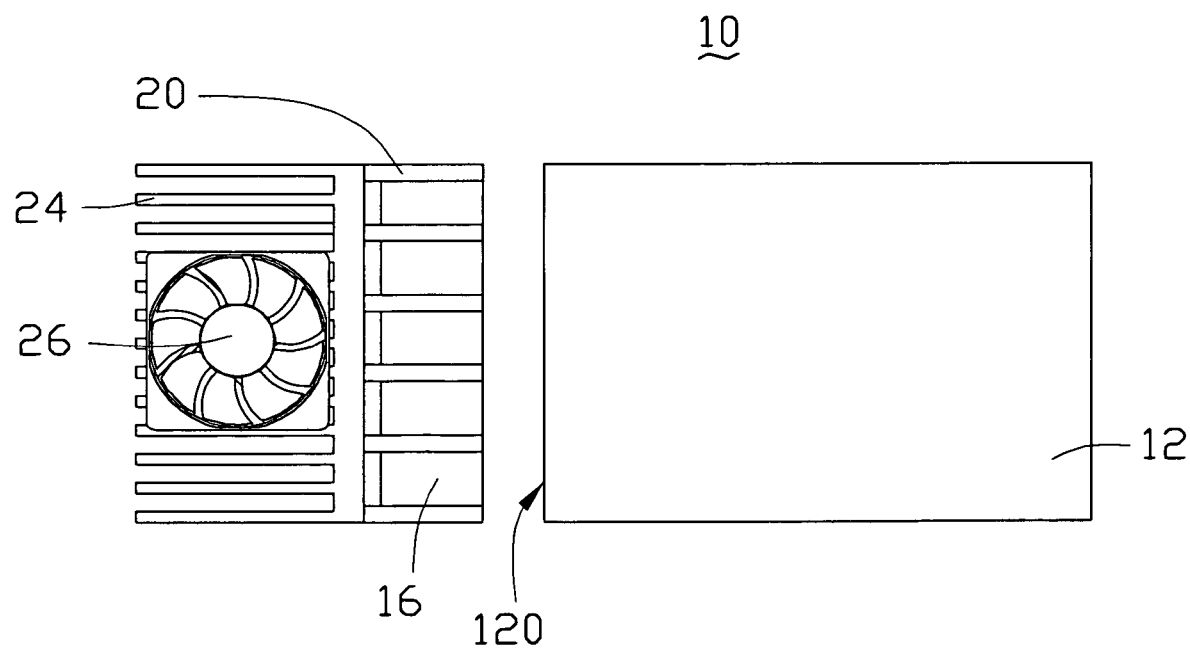
FIG. 2 is similar to FIG. 1, but viewed from another aspect.

Referring to FIGS. 1 and 2, a backlight module 10 in accordance with a preferred embodiment includes a light guide plate 12, at least one light source 14, a reflector 16, a thermally conductive layer 18, and a plurality of heat pipes 20. The light guide plate 12 has a light incident surface 120, and the at least one light source 14 is disposed adjacent to the light incident surface 120. The reflector 16 is provided partly around the at least one light source 14, and the thermally conductive layer 18 is formed on an inner surface of the reflector 16 near to the at least one light source 14. The heat pipes 20 are attached to an outer surface of the reflector 16 facing away from the at least one light source 14.

The at least one light source 14, according to the illustrated embodiment, can be an LED or a CCFL.

The cross section of the reflector 16 may be in arcuate form, square form, or polygonal form. In the illustrated embodiment, the cross section of the reflector 16 is in a square form. The metal material of the reflector 16 is preferably selected from a group consisting of copper, aluminum, and any alloy thereof In the illustrated embodiment, the material of the reflector is copper.

The thermally conductive layer 18 is comprised of conductive material having high ability of reflecting, in the illustrated embodiment, the material is silver particles. The silver particles can be coated or deposited on the inner side of the reflector 16 simultaneously in a coating or depositing process, for example, by direct current magnetron sputtering process. The thermally conductive layer 18 is configured for conducting and reflecting light and thermal emitted from the at least one light source 14. The thermally conductive layer 18 has a thickness in the range from 100 nm to 1000 nm.

The heat pipes 20 may be loop type pipes, single tubular type pipes, or flat-plate type pipes. In the illustrated embodiment, the heat pipes 20 are single tubular type pipes. The axes of the heat pipes 20 are all perpendicular to the axis of the reflector 16.

Wick structures are engaged in inner walls of the heat pipes 20. The wick structures can be groove type, web type and/or sintered type. Working fluid is contained in the heat pipes 20. The working fluid can be selected from the group consisting of pure water, ammonia, methane, acetone, and heptane. Preferably, the working fluid has some nano-particles added therein for improving heat conductivity thereof. The nano-particles may be carbon nanotubes, carbon nanocapsules, nano-sized copper particles, or any suitable mixture thereof. The wick structure of the heat pipes 20 can make the working fluid diffuse along different directions along the inner wall of the heat pipes 20.

The backlight module 10 further comprises a thermal interface material (TIM) layer 22 arranged between the reflector 16 and the heat pipes 20. The material of the TIM layer 22 may be selected from the group consisting of the carbon nanocapsule TIM, nano-particle TIM, nano-powder TIM, and nano-polymer TIM. In the illustrated embodiment, the TIM layer 22 comprises carbon nanotubes in silver gel solution.

In order to dissipate heat more efficiently, the backlight module 10 can further comprise a heat sink 24 attached to the heat pipes 20 and a fan 26 attached to the heat sink 24.

Figure 3:
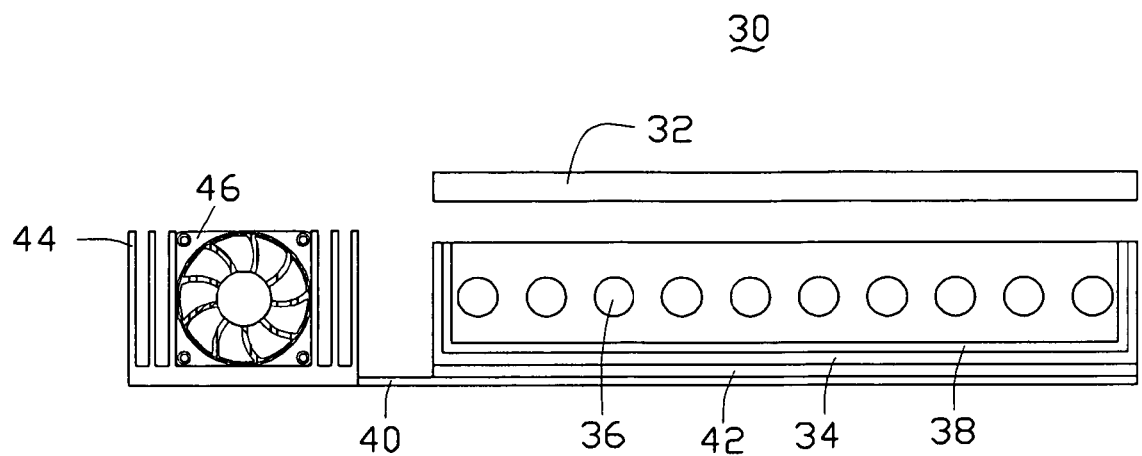
FIG. 3 is a schematic, side view of a direct type backlight module in accordance with another preferred embodiment.
Figure 4:
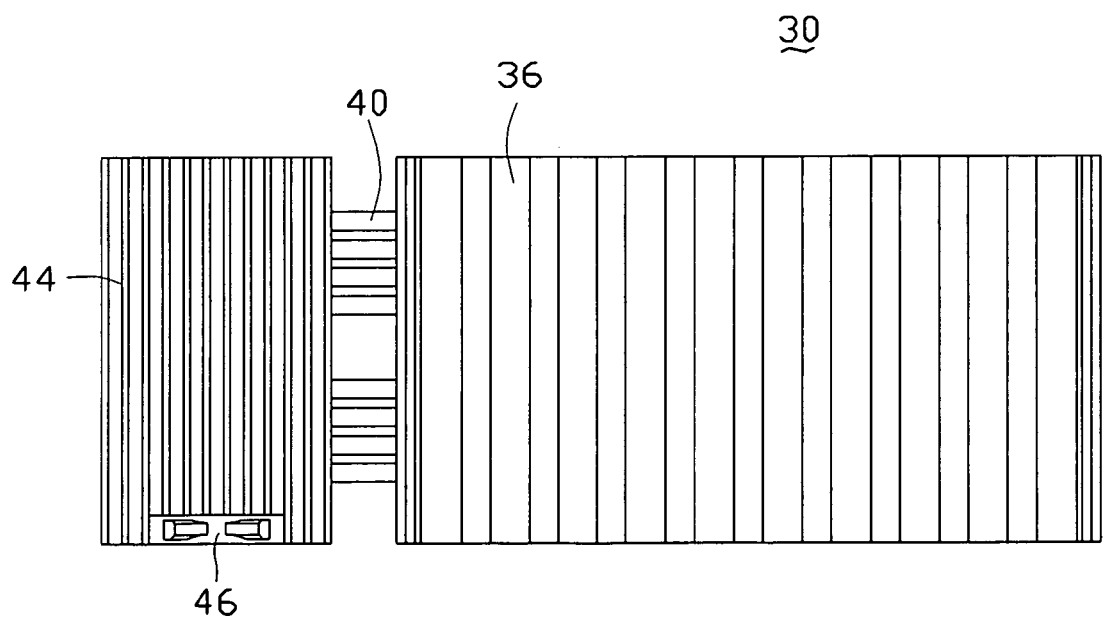
FIG. 4 is similar to FIG. 3, but viewed from another aspect, without showing the diffuser plate of FIG. 3.
Figure 5:
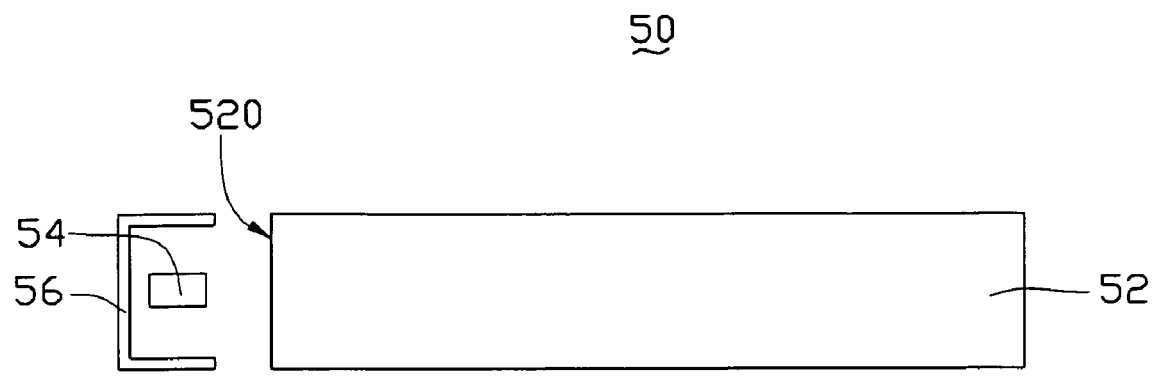
FIG. 5 is a schematic, side view of a conventional edge-lighting type backlight module.
Figure 6:
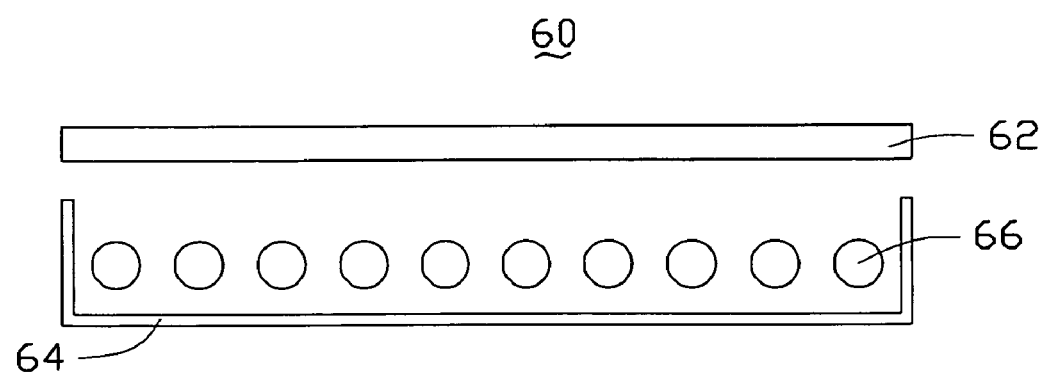
FIG. 6 is a schematic, side view of a conventional direct type backlight module.

Referring to FIGS. 3 and 4, in accordance with another embodiment, a direct type backlight module 30 includes a diffuser plate 32, a reflector 34, a plurality of light sources 36, a thermally conductive layer 38, and a plurality of heat pipes 40. The at least one light source 36 is arranged between the diffuser plate 32 and the reflector 34. The thermally conductive layer 38 is formed on an inner surface of the reflector 34 near to the at least one light source 36. The heat pipes 40 are attached to an outer surface of the reflector 34 facing away from the at least one light source 36. The heat pipes 40 are preferably connected with the reflector 34 by a TIM layer 42. Evaporation section and condensation section of heat pipes 40 are connected to the reflector 34 and a plurality of heat sink 44 separately. The heat pipes 40 are perpendicular to the reflector 34. A fan 46 is set next to the heat sink 44.

It is to be understood that, the reflector 34, the thermally conductive layer 38, the heat pipes 40, and the TIM layer 42 have similar parts to those in the first embodiment.

In operation, the thermally conductive layer 38 is not only configured for reflecting light but also conducting thermal emissions from the at least one light source 36. The thermal can further be transmitted outside of the backlight modules 30 by the heat pipes 40, and then dissipated by the heat sink 44 and the fan 46. As a result, the backlight module can dissipate more efficiently, and the working life will be prolonged.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A backlight module comprising:
   a light guide plate having a light incident surface;
   at least one light source disposed adjacent to the light incident surface;
   a reflector partly surrounding the at least one light source;
   a thermally conductive layer formed on an inner surface of the reflector facing the at least one light source; and
   a plurality of heat pipes each having one end thereof attached to an outer surface of the reflector, each heat pipe further extending away from the at least one light source.

2. The backlight module as described in claim 1, wherein the reflector is comprised of a material selected from the group consisting of copper, aluminum, and any alloy thereof.

3. The backlight module as described in claim 1, wherein the thermally conductive layer is comprised of silver.

4. The backlight module as described in claim 1, wherein the thermally conductive layer is comprised of silver particles having an average grain size in the range from about 100 nm to about 1000 nm.

5. The backlight module as described in claim 1, further comprising a thermal interface material layer arranged between the reflector and the heat pipes.

6. The backlight module as described in claim 5, wherein the thermal interface material layer is comprised of carbon nanotubes in silver paste solution.

7. The backlight module as described in claim 1, further comprising a heat sink coupled with the other ends of the heat pipes.

8. The backlight module as described in claim 7, further comprising a fan attached to the heat sink.

9. The backlight module as described in claim 1, wherein the at least one light source is one of at least one light emitting diode and at least one cold cathode fluorescent lamp.

10. A backlight module comprising:
    a diffuser plate;
    a reflector;
    at least one light source arranged between the diffuser plate and the reflector;
    a thermally conductive layer formed on an inner surface of the reflector facing the at least one light source; and
    a plurality of heat pipes each having one end thereof attached to an outer surface of the reflector, each heat pipe further extending away from the at least one light source.

11. The backlight module as described in claim 10, wherein the reflector is comprised of a material selected from the group consisting of copper, aluminum, and any combination alloy thereof.

12. The backlight module as described in claim 10, wherein the thermally conductive layer is comprised of silver.

13. The backlight module as described in claim 10, wherein the thermally conductive layer is comprised of silver particles having an average grain size in the range from about 100 nm to about 1000 nm.

14. The backlight module as described in claim 10, further comprising a thermal interface material layer arranged between the reflector and the heat pipes, the thermal interface material layer comprising a plurality of carbon nanotubes with silver gel therein.

15. The backlight module as described in claim 10, further comprising a heat sink coupled with the other ends of the heat pipes.

16. The backlight module as described in claim 15, further comprising a fan attached to the heat sink.

17. The backlight module as described in claim 10, wherein the at least one light source chosen from the group consisting of light emitting diodes and cold cathode fluorescent lamps.

* * * * *